United States Patent [19]

Jansson

[11] Patent Number: 4,640,171

[45] Date of Patent: Feb. 3, 1987

[54] BAND SAW INSTALLATION WITH VERTICALLY SPACED GUIDES

[75] Inventor: Kurt Jansson, Mariannelund, Sweden

[73] Assignee: AB A.K. Eriksson, Mariannelund, Sweden

[21] Appl. No.: 767,447

[22] Filed: Aug. 20, 1985

[30] Foreign Application Priority Data

Aug. 23, 1984 [SE] Sweden ................................ 8404210

[51] Int. Cl.$^4$ ............................................ B27B 15/08
[52] U.S. Cl. ......................................... 83/797; 83/808; 83/816; 83/425.2; 83/794
[58] Field of Search .............. 83/794, 797, 808, 425.4, 83/425.2

[56] References Cited

U.S. PATENT DOCUMENTS

| | | | |
|---|---|---|---|
| 325,629 | 9/1885 | Pyott | 83/794 |
| 2,935,101 | 5/1960 | Wheeler | 83/794 |
| 3,318,347 | 5/1967 | Alich | 83/808 X |
| 3,621,895 | 11/1971 | Leidig | 83/808 X |

FOREIGN PATENT DOCUMENTS 2056908 3/1981 United Kingdom .............. 83/425.2

Primary Examiner—Donald R. Schran
Attorney, Agent, or Firm—Sughrue, Mion, Zinn, Macpeak and Seas

[57] ABSTRACT

A band saw, especially intended for sawing logs with the grain or dividing wood blocks, comprising upper and lower band pulleys (6,4) which can be adjusted relative to one another. Extending around the pulleys is an endless, band-like saw blade (11) which is driven by one (4) of the bandpulleys. The lower band pulley (4) is journalled in a frame structure (3) which can be moved along two mutually parallel guides (13,14) extending at right angles to the feed direction of the material to be sawn. The frame structure carries a post (5) which in turn carries at the top thereof the other band pulley (6). In accordance with the invention the one guide (14) is located substantially vertically above the other guide (13), suitably so that the two guides (13,14) are located in a common vertical plane which passes vertically through the post (5).

5 Claims, 2 Drawing Figures

BAND SAW INSTALLATION WITH VERTICALLY SPACED GUIDES

BACKGROUND OF THE INVENTION

The present invention relates to a band saw, and in particular to a band saw for sawing logs with the grain (band resaw) or for dividing wood blocks, the band saw being of the kind which comprises upper and lower band pulleys which can be adjusted in relation to one another and over which there extends an endless band-like saw blade which is driven by one of the band pulleys, and in which saw the lower pulley is journalled in a frame structure which can be moved axially along two mutually parallel guides extending at right angles to the feed direction of the material to be sawn, and in which the other pulley is mounted on the upper end of a post located on the frame structure.

Such band saws are known from, for example, our Swedish Patent Specification No. 7312757-3. Although band saws of this kind are found to function satisfactorily, they are nevertheless encumbered with certain structural drawbacks, of which the following are examples. When combining the saw with chipper devices, located immediately upstream of the saw blade and intended to cut peripheral log portions into cellulose chip form, an obstacle is presented which disturbs the downward passage of the chips into an underlying collecting receptacle. In addition, the known saws are extremely heavy and require a relatively large amount of space.

These drawbacks are at least partly due to the fact that the two guides of the known saw construction are placed in juxtaposition in a mutually common horizontal plane. As a result hereof, when the saw is combined with a disc chipper the guide located furthest from the saw blade presents, inter alia, an obstacle to the passage of chips into the underlying chip collector. This juxtaposed relationship of the guides also widens the saw frame unnecessarily in the horizontal plane, thereby increasing the space required. This conventional positioning of the guides also means that the guide located beneath the upper pulley post supports substantially the whole weight of the saw, whereas the other guide is relied upon to prevent tipping. As a result of these additional functions of the guides, the guides are given dimensions and weights greater than would be necessary if it were possible to distribute the weight of the saw uniformly between the two guides. The asymmetric weight distribution on the two guides can also lead to other drawbacks.

SUMMARY OF THE INVENTION

These problems are overcome in accordance with the invention by positioning the two guides so that one is located substantially vertically above the other. With this guide arrangement there is nothing to prevent the chips from falling into the collecting receptacle intended therefor. In addition, the width of the saw frame in the log feed direction can be greatly reduced in relation to the conventional saw frames, as can also other dimensions, together with the weight and cost of the guides, since the weight of the saw and the tipping moment can both be distributed equally between the two guides.

In a preferred embodiment the two guides are located in a common vertical plane which passes vertically through the post supporting the upper band pulley.

In a further advantageous embodiment the frame is given a box-form, so as to enclose both motor and power transmission to the lower band pulley more effectively.

In order to enable the saw blades to be changed more easily when using groups of three to four interconnected band saws, the frame with guides is suitably made displaceable in a direction at right angles to the longitudinal axis of the guides.

BRIEF DESCRIPTION OF THE DRAWINGS

The invention will now be described in more detail with reference to the accompanying drawings, in which.

DETAILED DESCRIPTION OF THE PREFERRED EMBODIMENT

Figure 1:
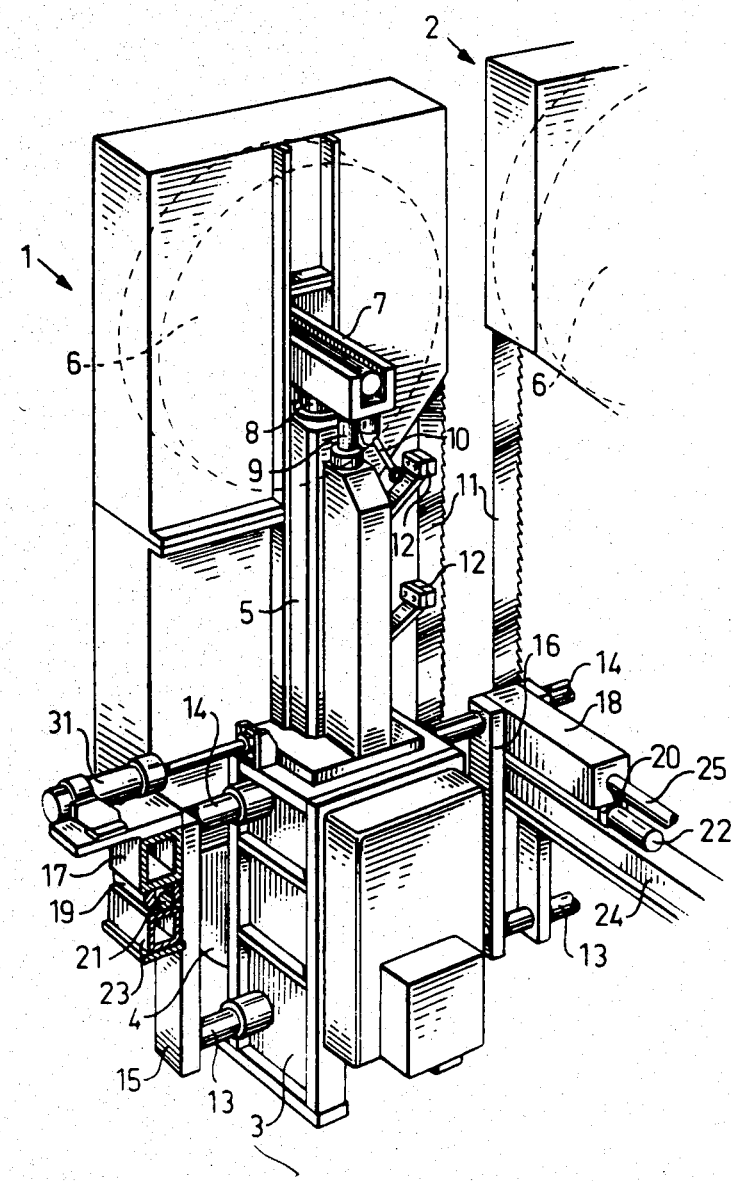
FIG. 1 is a schematic perspective view of one embodiment of a band saw according to the invention.

FIG. 1 illustrates a band saw 1 and a further band saw 2 located adjacent thereto, this latter band saw being shown only in part. Each of the band saws includes a box-like frame structure 3 which encloses a drive motor and torque transmission means for powering a lower band pulley 4 or like wheel journalled in the frame 3. The frame 3 carries a post 5 which in turn carries at its upper end an upper band pulley 6 or like wheel. In the illustrated embodiment the pulley 6 is mounted in a conventional manner on a beam 7 which co-operates with a hydraulic piston-cylinder device 8 for raising and lowering the pulley 6. The wheel 6 may also be arranged to be tilted about a horizontal axis and swung about a vertical axis in a known manner, e.g. with the aid of the illustrated devices 9 and 10 respectively. These devices will not be described in detail here, however, since they are found described and illustrated in our earlier mentioned Swedish Patent Specification No. 7312757-3. Extending around the pulleys 4 and 6 is an endless band-like saw blade 11, whose deflection is restrained by a guide member 12.

In order to enable the saw blade 11 to be brought to a desired position in relation to a log or a wood block to be sawn, the frame 3, the post 5 and the pulleys 4 and 6 are arranged to be moved as a single unit on two mutually horizontal guides 13 and 14, which extend between and are connected to two vertical suspension beams 15 and 16, said guides being located in a common vertical plane which preferably passes vertically through the post 5. In the illustrated embodiment the upper ends of the beams 15 and 16 are each connected to a respective screw jack 17 and 18 mounted on respective guide shoes 19 and 20 which run along respective round guides 21 and 22. The round guides 21 and 22 are firmly mounted on frame beams 23 and 24. The jacks 17 and 18 are driven via rotatable shafts 25, for displacement of the frame unit in the feed direction of the material to be sawn, in order to facilitate saw-blade changes.

Reference numeral 31 identifies a hydraulic piston-cylinder device which is operable to displace the frame 3 on the horizontal guides 13 and 14. In certain cases this device can be replaced with a setting arrangement having two fixed positions.

A band saw according to the aforedescribed embodiment is extremely compact, since contrary to conventional band saws of this kind the frame structure 3 has its largest extension in the vertical plane and not in the horizontal plane, with no appreciable increase in the height of the saw, since height in this case is mainly determined by the diameters of the pulleys 4 and 6 and the distance set therebetween. The saw may also be made lighter in weight than conventional saws of this kind. A contributory factor in this respect resides in the illustrated vertical positioning of the two guides 13 and 14 in a common vertical plane, which enables the full weight of the saw to be distributed uniformly between the guides. Among other things this enables the dimensions of the guides to be reduced considerably in comparison with guides of the prior art saws, in which substantially the whole weight of the saw is taken up by solely one guide.

As will be understood, by positioning the horizontal guides in the proposed and illustrated manner a relatively large space, previously occupied in prior art saws by one of said guides upstream of the saw blade, is left free for chips to pass down to an underlying chip collecting receptacle, when the saw is combined with an upstream located chipper. The illustrated guide arrangement thus provides the important benefits of a more compact band saw and the provision of a free-fall space by removal of the aforesaid obstructing guide. This also results in less stoppages in production.

The latter benefit mentioned above will be better understood from FIG. 2, which is a schematic horizontal plan view of the two band saws 1 and 2 shown side by side in FIG. 1, the saw elements in FIG. 2 being identified by the same references as those used in FIG. 1.

Figure 2:
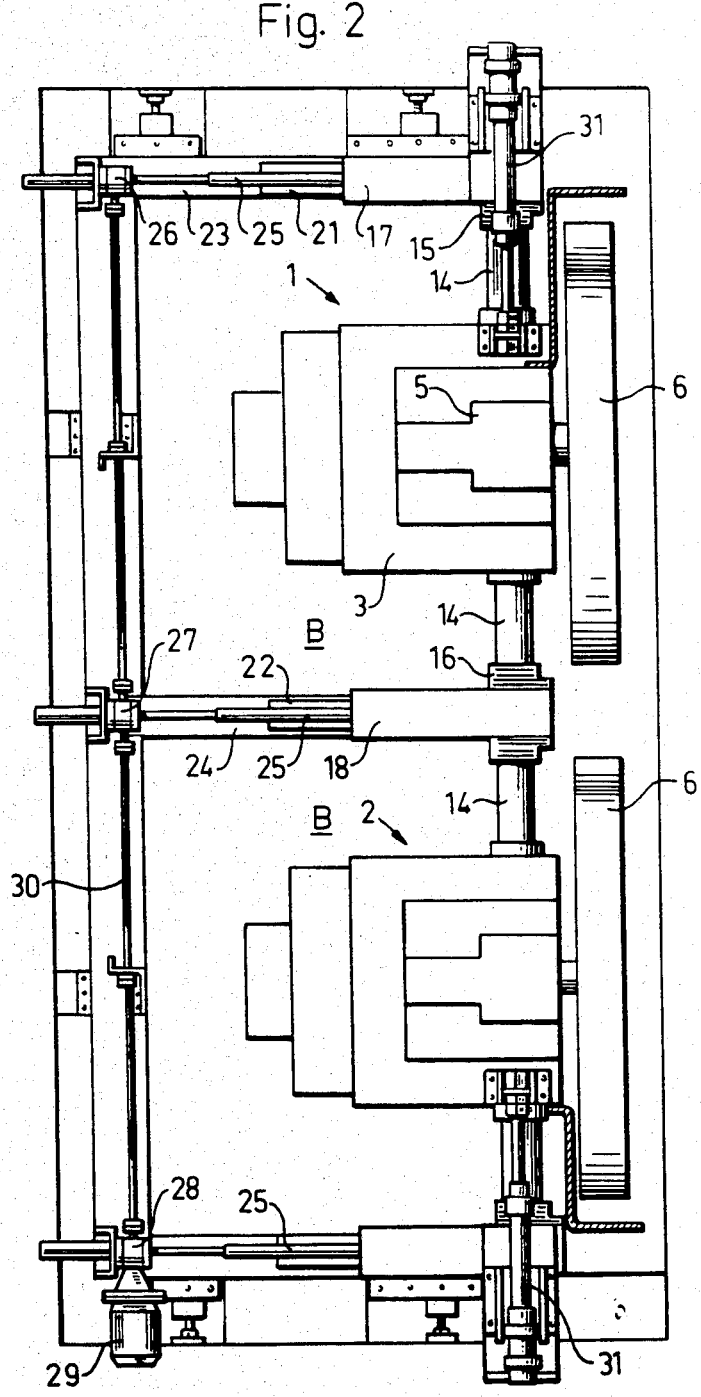
FIG. 2 is a horizontal plan view of an arrangement which includes two band saws according to FIG. 1.

As illustrated in FIG. 2, the shafts 25 operative to displace the frame or saw units in the feed direction of the material to be sawn are driven synchronously through bevel gears 26–28 by a common shaft 30 driven in turn by a drive motor 29. The shaft 30 may be used as a common drive shaft for driving the shafts 25 of a number of interconnected saws. Such displacement of the frame unit is necessary when wishing to change a saw blade, when the illustrated saws are combined with a further saw or saws positioned so that the pulleys thereof are in close juxtaposition with the pulleys 6.

It will be seen from FIG. 2 that with saws constructed in accordance with the invention there is obtained a very compact saw-arrangement with a free space upstream of and to one side of each saw frame 3, providing, for example, a non-obstructing free passage for chips cut by the aforesaid chipper, down into an underlying chip-collecting receptacle. This space is referenced B in FIG. 2.

Although a band saw according to the invention has been described with reference to an illustrated embodiment thereof, it will be understood by those skilled in this art that the structural solutions illustrated in the drawings and described above can be modified and varied in many different ways within the scope of the invention.

I claim:

1. A band saw installation, especially intended for sawing logs with the grain or dividing wood blocks, comprising: two spaced pairs of upper and lower saw band pulleys (6, 4) which can be adjusted relative to one another, a pair of endless, band-like saw blades (11) individually extending around each pair of pulleys and individually driven by one (4) of the pulleys in each pair, a pair of frame structures (3) in which the lower pulleys of each pair are individually journalled, and two pairs of mutually parallel guide members (13, 14) extending at right angles to the feed direction of the material to be sawn, said frame structures being individually and slidably mounted on said pairs of guide members, each frame structure carrying a vertically upstanding post (5) which in turn carries at a top thereof said upper pulley (6), and one guide member (14) of each pair being located substantially vertically above the other guide member (13) of each pair, said installation thus being substantially vertical in overall configuration and horizontally compact in the feed direction of the material, and the weight of the installation being substantially equally distributed between and borne by the upper and lower guide members of each pair.

2. A band saw installation according to claim 1, wherein the two guide members of each pair are located in a common vertical plane which passes vertically through an associated post.

3. A band saw installation according to claims 1 or 2, wherein each frame structure has the form of a box which houses a motor operative to drive the lower pulley.

4. A band saw installation according to claim 3, further comprising means for displacing the frame structures and associated guide members at right angles to the axial direction of the guide members.

5. A band saw installation according to claim 4, wherein said displacing means comprises a plurality of shafts (25) respectively flanking the frame structures, said shafts being driven synchronously by a further shaft (30) connected to a drive motor (29).

* * * * *